Feb. 22, 1955 W. G. KÖGEL ET AL 2,702,457
EVAPORATOR STRUCTURE IN ABSORPTION REFRIGERATION
Original Filed Feb. 26, 1949 5 Sheets-Sheet 4

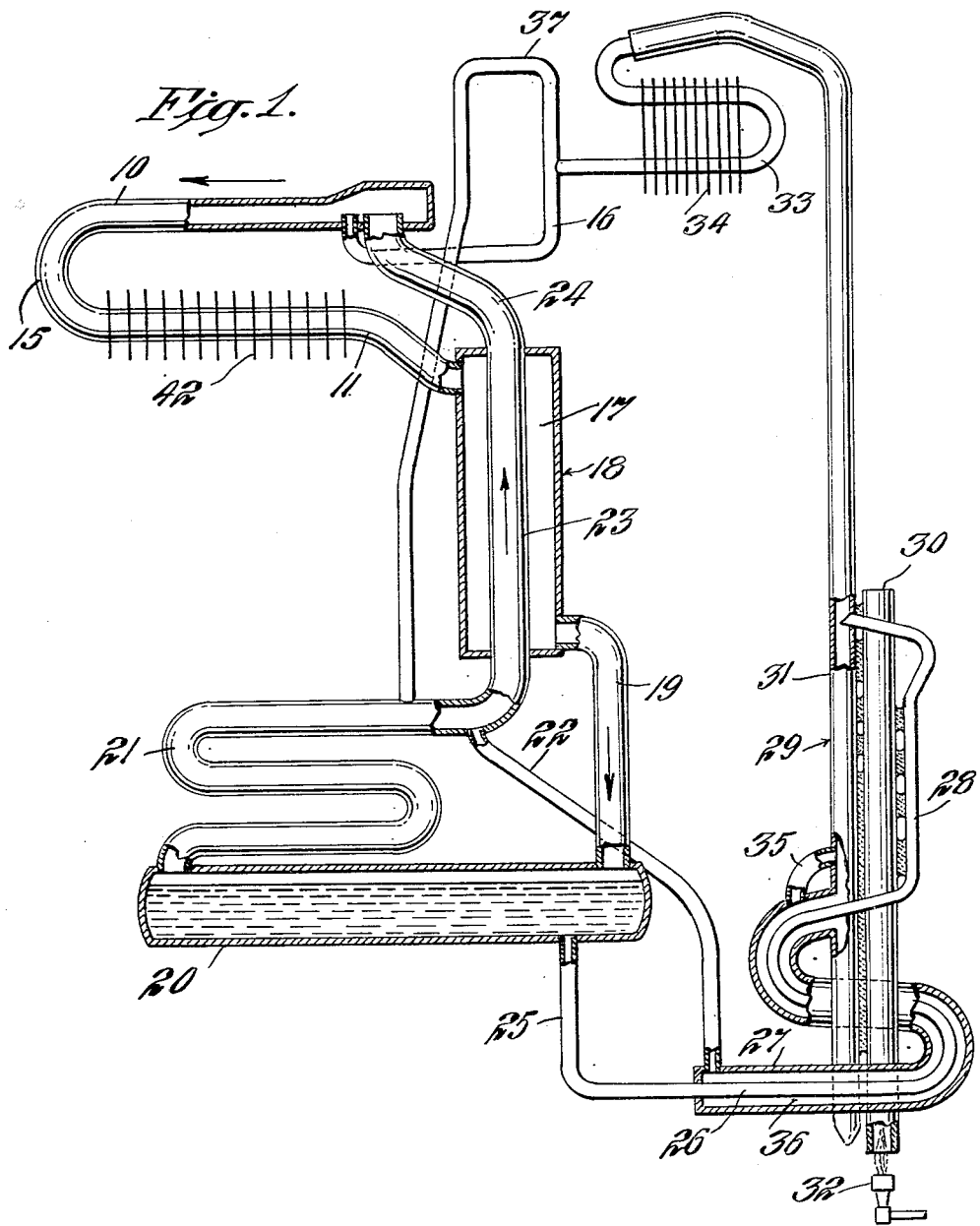

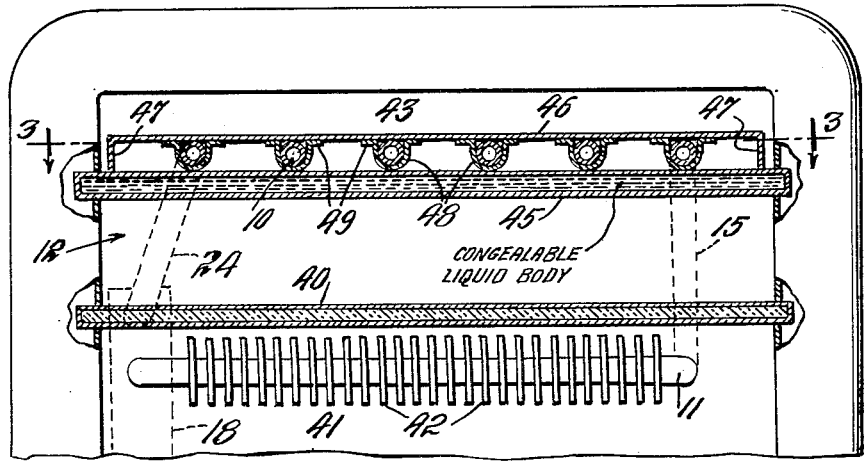

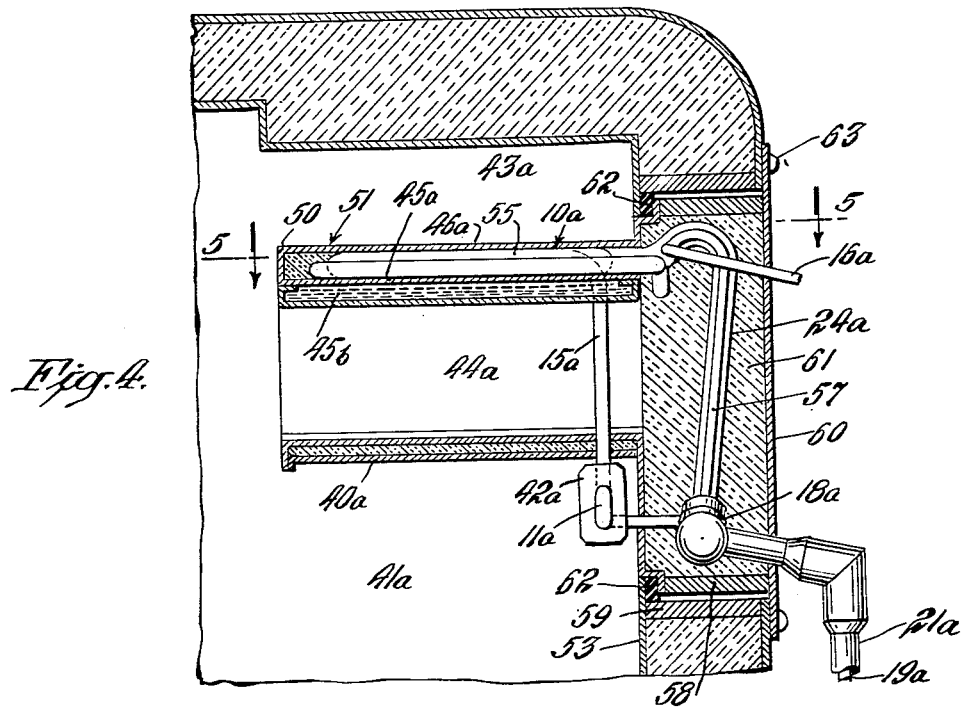
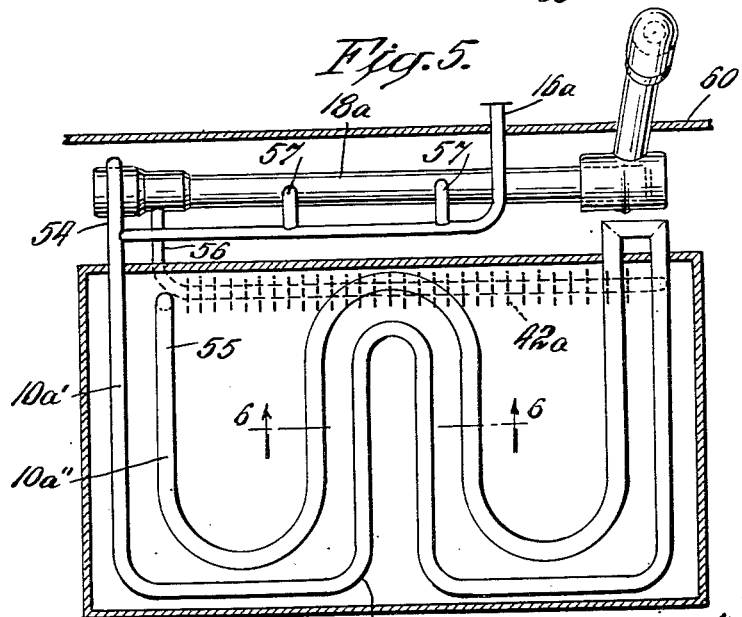

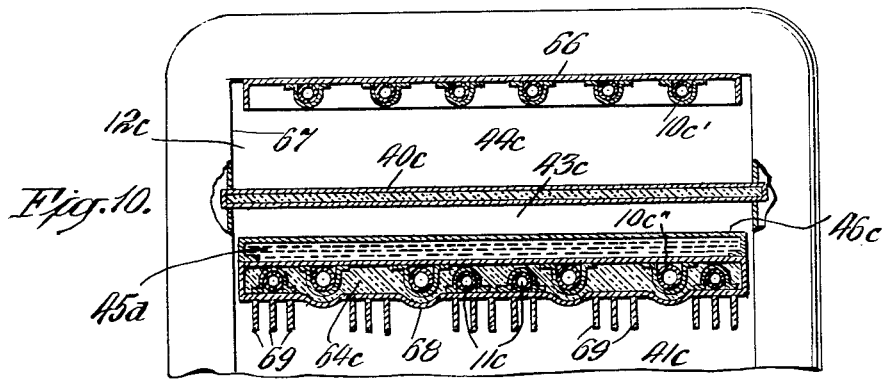
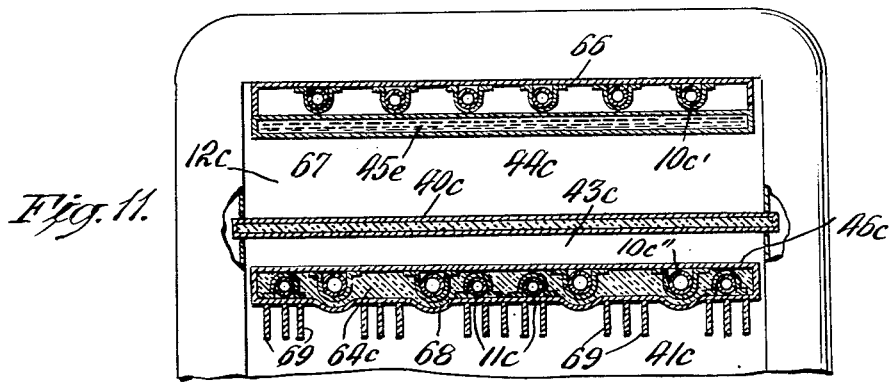
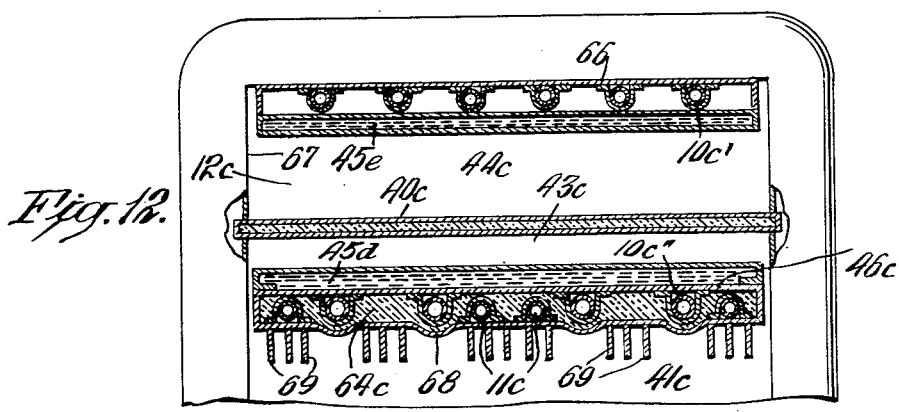

United States Patent Office 2,702,457
Patented Feb. 22, 1955

2,702,457

EVAPORATOR STRUCTURE IN ABSORPTION REFRIGERATION

Wilhelm Georg Kögel, Stockholm, and Gunnar Axel Grubb, Bromma, Sweden, assignors to Aktiebolaget Elektrolux, Stockholm, Sweden, a corporation of Sweden Original application February 26, 1949, Serial No. 78,502. Divided and this application August 23, 1952, Serial No. 305,966

Claims priority, application Sweden March 2, 1948

5 Claims. (Cl. 62—95)

This invention relates to refrigeration and is especially concerned with refrigerators of the absorption type employing an inert gas or pressure equalizing agent. More particularly, the invention is concerned with distributing refrigerating effect in absorption refrigerators of this type having a plurality of evaporators or cooling elements operable at different temperatures. This application is a division of our copending application Serial No. 78,502, filed February 26, 1949, now abandoned.

It is an object of the invention to provide improvements for cooling adjacent spaces or sections of a refrigerator with the aid of evaporators or cooling elements of refrigeration systems of the above type which are operable at different temperatures, particularly to restrict and retard an increase in temperature in one of the sections upon increase in load on the other section.

Another object of the invention is to effect cooling of one of the spaces or sections of the refrigerator with the aid of a low temperature evaporator which makes use of a cold accumulator, whereby safe refrigerating temperatures will be maintained not only in such space or section but also in another space or section which is cooled by a higher temperature evaporator connected to receive inert gas partially enriched in refrigerant from the low temperature evaporator.

The above and other objects and advantages of the invention will be more fully understood from the following description taken in conjunction with the accompanying drawings forming a part of this specification, and of which:

Fig. 1 illustrates more or less diagrammatically an absorption refrigeration system of the inert gas type to which the invention is applied;

Fig. 2 is a fragmentary front elevation looking toward the rear of a storage space of a refrigerator embodying the invention, partly broken away and in section, the cooling unit being adapted to be connected in an absorption refrigeration system like that diagrammatically shown in Fig. 1;

Fig. 3 is a horizontal section taken at line 3—3 of Fig. 2 to illustrate the construction more clearly;

Fig. 4 is a fragmentary side sectional view of a refrigerator illustrating another embodiment of the invention;

Fig. 5 is a sectional view, taken at line 5—5 of Fig. 4, to illustrate the cooling unit and connections thereto more clearly;

Fig. 6 is a fragmentary sectional view taken at line 6—6 of Fig. 5;

Figs. 8 to 12 inclusive are fragmentary front elevations of refrigerators, partly broken away and in section, illustrating further embodiments of the invention.

Figure 7:
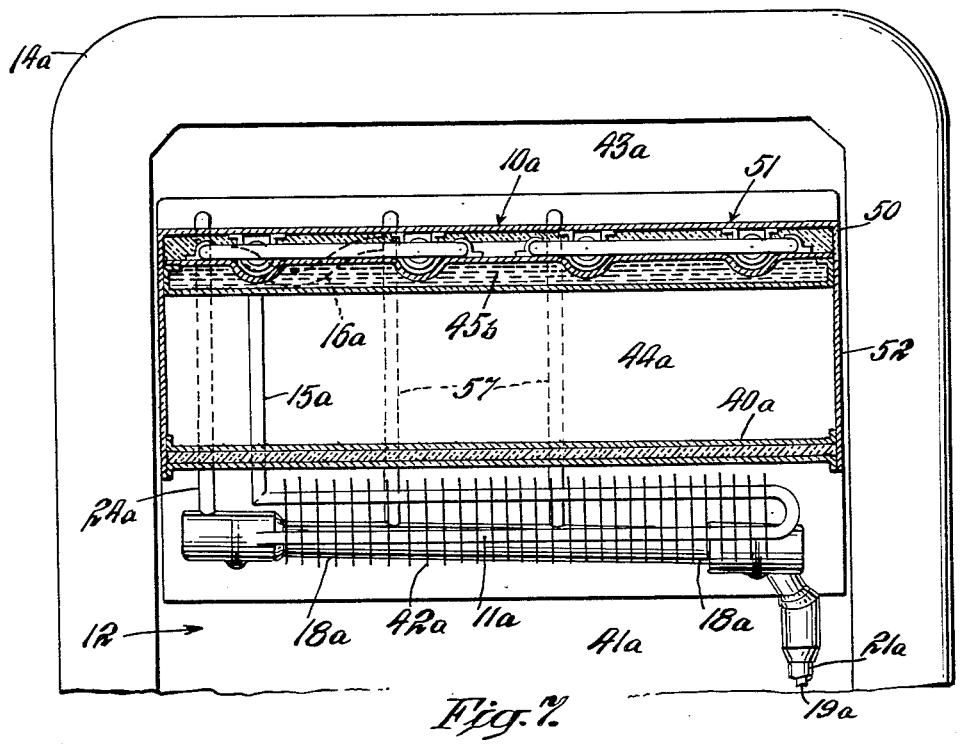
Fig. 7 is a front elevation, partly broken away and in section, of the refrigerator shown in Fig. 6.

In absorption refrigeration systems of the inert gas type having evaporators adapted to operate at different temperatures, such evaporators or cooling elements are usually formed of piping which are shaped as coils and connected by conduits to other parts of the system. In a household refrigerator of the kind in which the interior is subdivided into a plurality of compartments one above another, the individual compartments are arranged to be cooled to different temperatures by the evaporators. In such case the evaporator coils are horizontally disposed and constructed to provide a maximum amount of usable storage space in the interior of the refrigerator.

One manner of employing a plurality of such horizontally disposed evaporator coils 10 and 11 in accord with the invention is shown in Figs. 2 and 3. The evaporator coils 10 and 11 are disposed in an insulated interior 12 of a refrigerator cabinet 14 adapted to be closed by a door or closure member (not shown) which is hinged to the front of the cabinet. The evaporator sections 10 and 11 form part of an absorption refrigeration system of the inert gas type which is more or less diagrammatically illustrated in Fig. 1. In order to simplify the drawings, the horizontally disposed evaporator coils 10 and 11 of Figs. 2 and 3 have simply been shown as straight conduit sections in Fig. 1 which are connected by a vertical bend 15.

In a system of the type illustrated in Fig. 1 a refrigerant fluid, such as liquid ammonia, for example, is introduced through a conduit 16 into the evaporator sections 10 and 11. In the evaporator sections 10 and 11 refrigerant fluid evaporates and diffuses into an inert gas, such as hydrogen, for example, to produce refrigeration and abstract heat from the surroundings. The resulting gas mixture of refrigerant and inert gas flows from the evaporator sections 10 and 11 through an outer passage 17 of a gas heat exchanger 18 and vertical conduit 19 into an absorber comprising a vessel 20 and a looped coil 21. In the absorber vessel 20 and coil 21 refrigerant vapor is absorbed by a suitable absorbent, such as water, for example, which is introduced into coil 21 through a conduit 22. The hydrogen or inert gas, which is practically insoluble and weak in refrigerant, returns to the evaporator sections 10 and 11 through an inner passage 23 of the gas heat exchanger 18 and a conduit 24.

The circulation of gas in the gas circuit just described is due to the difference in specific weight of the columns of gas rich and weak, respectively, in refrigerant vapor. Since the column of gas rich in refrigerant vapor and flowing from the evaporator sections 10 and 11 to the absorber coil 21 is heavier than the gas weak in refrigerant and flowing from the absorber coil 21 to the evaporator sections, a force is produced or developed within the system for causing circulation of inert gas in the manner described.

From the vessel 20 enriched absorption liquid flows through a conduit 25 and an inner passage 26 of a liquid heat exchanger 27 into the lower end of a vapor lift tube 28 of a generator or vapor expulsion unit 29. The generator unit 29 comprises a heating flue 30 having the vapor lift tube 28 and a boiler pipe 31 in thermal exchange relation therewith, as by welding, for example. By heating generator unit 29, as by a gas burner 32, for example, liquid from the inner passage 26 of the liquid heat exchanger is raised by vapor lift action through tube 28 into the upper part of the boiler pipe 31. The liberated refrigerant vapor entering boiler pipe 31 from the tube 28, and also vapor expelled from solution in the boiler pipe, flows upwardly into an air cooled condenser 33 provided with a plurality of heat dissipating members or fins 34. Refrigerant vapor is liquefied in the condenser 33 and returns to the evaporator sections 10 and 11 through the conduit 16 to complete the refrigerating cycle.

The weakened absorption liquid, from which refrigerant vapor has been expelled, is conducted from boiler pipe 31 through a conduit 35, outer passage 36 of the liquid heat exchanger 27 and conduit 22 into the upper part of the absorber coil 21. The lower end of the condenser 33 is connected by conduit 37 to the gas circuit, as to the upper part of the absorber coil 21, for example, so that any non-condensable gas which may pass into the condenser can flow to the gas circuit and not be trapped in the condenser.

In adapting the refrigeration system of Fig. 1 for use in the refrigerator cabinet 14 of Fig. 2, the evaporator sections 10 and 11 are disposed in the thermally insulated interior 12 thereof, and the gas heat exchanger 18, which is indicated in dotted lines in Fig. 2, and other parts may be disposed at the rear of the cabinet. The horizontally disposed evaporator sections 10 and 11 are connected in series relation with inert gas from conduit 24 flowing through the upper evaporator section 10 in the presence of and in parallel flow with liquid refrigerant which is introduced through conduit 16. From evaporator section 10 inert gas then passes through the vertical connection 15 for flow through the lower evaporator section 11. Unevaporated refrigerant is also conducted from evaporator section 10 through the connection 15 into the lower evaporator section 11 and flows therein in the presence of and in parallel flow with the inert gas. It is to be understood, however, that inert gas and liquid refrigerant may pass each other in counterflow relation in the lower evaporator section 11, and liquid refrigerant may be conducted thereto directly from a separate condenser section, if desired.

Since the inert gas flows successively through the evaporator sections 10 and 11, the gas in the upper evaporator section contains a lesser amount of refrigerant vapor than the gas in the lower evaporator section 11. The partial vapor pressure of the refrigerant is a gradient, so that the temperature of liquid refrigerant in the evaporator sections 10 and 11 also is a gradient, the evaporating temperature of liquid being lower in the upper evaporator section 10 which constitutes the freezing portion of the cooling unit.

In the refrigerator cabinet 14 of Fig. 2, the interior 12 thereof is subdivided into a plurality of compartments one above the other by a horizontal partition 40 which is constructed to thermally insulate the compartments from one another. The heat insulating partition 40 desirably extends over the entire width of the interior of the cabinet, and from the rear wall toward the open front of the cabinet so that circulation of air between the spaces above and below the partition is substantially prevented when the door or closure member of the cabinet is in its closed position. The lower evaporator section 11 may be positioned immediately beneath the insulating partition 40, and, since this evaporator section is the higher temperature section or portion of the cooling unit, it may be effectively utilized to cool air in the lower compartment 41. To provide adequate heat transfer surface, the coils of the lower evaporator section 11 may have a plurality of fins 42 secured thereto. The compartment above the insulating partition 40 is adapted to serve as a freezing section of the refrigerator cabinet 14 in which the lower temperature evaporator section 10 is positioned.

The freezing unit of the refrigerator is subdivided into an upper section 43 and a lower section 44 by a horizontally disposed heat conductive member 45 with which the upper evaporator coil 10 is thermally associated. As shown, this is accomplished by arranging the looped coil forming the evaporator section 10 in thermal exchange relation with the upper side of the member 45. In addition, a horizontal plate 46 having downwardly depending flanges 47 is positioned over the evaporator section 10 in good thermal contact therewith. This may be accomplished by providing clamping members 48 along the straight portions of the evaporator coil or section 10 that envelop the piping and have flanges 49 which are secured, as by brazing, for example, to the underside of the plate 46.

The upper section 43 of the freezing unit may be referred to as an ice freezing section adapted to receive ice trays for freezing water and the like, the plate 46 being substantially flat and serving as a supporting shelf for such ice trays. The lower section 44 of the freezing unit desirably is of greater depth than the upper portion 43 and may be referred to as a frozen food section adapted to receive frozen food packages and other matter to be frozen. Since the low temperature evaporator coil 10 is in good heat conductive relation with the heat conducting member 45 and also the plate 46, heat is effectively abstracted from ice trays positioned on the plate 46 and also from matter stored in the frozen food section 44. Although not shown, a suitable closure member or members desirably may be provided at the front opening of the freezing unit to close both the upper and lower portions 43 and 44, respectively.

In accordance with the invention, the heat conducting member 45 desirably is constructed as a cold accumulator having a hollow interior which is filled with a solution that freezes at a low temperature. Such a cold accumulator may comprise a pair of spaced apart plates which are relatively close to one another and sealed at the peripheral edges thereof to provide a hollow interior for holding a substance, such as a eutectic solution, for example, which freezes at a temperature of about —10° to —15° C.

During the periods when the ice freezing section 43 is under a small load, the low temperature evaporator section 10 is effectively employed to abstract heat from the body of eutectic solution in the member 45, thereby lowering the eutectic solution to a very low temperature adequate to maintain frozen food in the frozen food section 44 well below the freezing temperature. When ice trays containing water to be frozen are placed on the supporting shelf or plate 46, the load on the ice freezing section 43 is increased. With a substantial increase in ice freezing load, the temperature of the low temperature evaporator section 10 may increase to a value which is not far below the freezing temperature of water.

If the cold accumulator 45 were not provided, the evaporator coil 10 alone would have to be relied upon to keep frozen food in the frozen food section at a safe refrigerating temperature. However, a substantial increase in ice freezing load may cause the evaporator coil 10 to rise to a temperature which is not far below the freezing temperature and which will remain substantially constant for a considerable length of time during the entire ice freezing period. Under such conditions the ability of the evaporator coil 10 alone to maintain frozen food at a safe refrigerating temperature is decreased, and under severe operating conditions the evaporator section 10 may be ineffective to keep frozen food at a sufficiently low temperature.

By providing the cold accumulator 45, undesirable increase in temperature of the frozen food section 44 is avoided, particularly frozen food stored in the uppermost part of such freezing section. In accord with the invention the total melting heat of the cold accumulator 45 desirably is balanced so that the eutectic solution will remain frozen during the interval of time that water stays in a liquid state in the ice trays. The cold accumulator desirably may be oversize and larger than actually necessary to insure that it will take care of the most severe load on the ice freezing section 43. However, the cold accumulator should not needlessly be made unduly large because this reduces the maximum amount of storage space made available for ice trays, frozen food and other matter adapted to be placed in the freezing sections 43 and 44. When the eutectic solution in the cold accumulator is frozen or charged at the time ice trays containing water are positioned in the ice freezing section 43, the decrease in temperature of the supporting shelf or plate 46 that would otherwise occur is substantially reduced, thereby accelerating the rate at which ice is formed to a relatively high extent.

Further, it will be seen in Figs. 1 and 2 that evaporator section 11 receives liquid refrigerant from evaporator section 10. During periods of low load on evaporator section 10 the temperature of the cold accumulator 45 becomes reduced so that, upon subsequent increase in load on the low temperature evaporator section 10, the cold accumulator 45 in effect constitutes a source of supply of refrigeration. In this way the quantity of liquid refrigerant necessary in evaporator section 10 to satisfy such increased load is reduced, and the liquid refrigerant not required in evaporator section 10 to produce refrigeration therein flows by gravity into the higher temperature evaporator section 11 and made available in the latter. Thus, under the most adverse operating conditions encountered when the load on the low temperature evaporator section 10 is increased, an adequate supply of liquid refrigerant for the higher temperature evaporator section 11 is insured to maintain a safe refrigerating temperature in the lower compartment 41 in which foods are kept at a temperature above the freezing temperature.

Figs. 4 to 7 inclusive illustrate another embodiment of the invention in which there is provision for maintaining a frozen food section 44a at a safe refrigerating temperature even when the load on the ice freezing section 43a is increased at times.

As best shown in Figs. 4 and 7, the cooling unit comprises a shell or casing 50 having a top wall 51, bottom wall 40a and side walls 52. The shell extends across the entire width of the interior 12a of the cabinet 14a, and from the rear wall 53 toward the open front of the cabinet so that circulation of air between the space 41a and freezer sections 43a and 44a is substantially prevented when the door of the cabinet, not shown, is in its closed position. As in the embodiment first described, one or more closure members desirably may be provided at the front openings of the freezer portions 43a and 44a.

The low temperature evaporator 10a is disposed in the upper part of the shell 50, as will be described more fully hereinafter, while the higher temperature evaporator 11a is positioned in the upper part of the lower compartment or space 41a. The evaporator sections 10a and 11a are adapted to be connected to other parts of an absorption refrigeration system of the inert gas type and like that diagrammatically shown in Fig. 1. However, the parts of the refrigeration system which are shown in Figs. 4, 5 and 7 differ from those illustrated in Fig. 1 in that a horizontal gas heat exchanger 18a is provided to which the evaporator sections 10a and 11a are connected.

In Figs. 4 and 5 inert gas weak in refrigerant flows from the upper end of the absorber coil through a conduit 21a, an inner passage of the horizontal gas heat exchanger 18a and conduit 24a to which is connected one end of the evaporator section 10a, as indicated at 54 in Fig. 5. Liquid refrigerant from the condenser is also conducted to the same end of the evaporator section 10a through a conduit 16a, so that liquid refrigerant passes through the upper evaporator section 10a in parallel flow with inert gas. Both liquid refrigerant and inert gas pass from the upper evaporator section 10a at 55 through the vertical connection 15a for parallel flow in the lower evaporator section 11a which is provided with heat transfer members or fins 42a.

Inert gas rich in refrigerant flows from the higher temperature evaporator section 11a at 56 into an outer passage of the gas heat exchanger 18a and thence through a conduit 19a which is connected at its lower end to the absorber vessel in a manner similar to the conduit 19 in Fig. 1. As best shown in Fig. 4, the conduit 21a for inert gas weak in refrigerant envelops and surrounds the conduit 19a through which inert gas rich in refrigerant returns to the absorber. In order to precool liquid refrigerant conducted to the upper evaporator section 10a through the conduit 16a, the latter is connected at spaced apart regions to the outer passage of the gas heat exchanger 18a by conduits 57, as shown in Fig. 5. In this way natural circulation of inert gas from the outer passage of the gas heat exchanger 18 takes place through a part of conduit 16a and evaporation and diffusion of refrigerant into inert gas takes place, thereby taking up heat from liquid refrigerant before being introduced into the evaporator section 10a.

In order to position the evaporator sections 10a and 11a and shell 50 in the thermally insulated interior 12a of the cabinet 14a, the rear wall 53 is formed with an opening 58 defined by a rectangular frame 59 which may be formed of wood, for example. A cover or closure member 60 for the opening, which contains insulating material 61 and in which the gas heat exchanger 18a is embedded, is arranged to bear against a gasket 62 of suitable insulating material and is removably secured at 63 to the rear wall 53.

The top wall 51 of the shell 50 comprises spaced apart plates 46a and 45a, and the low temperature evaporator section 10a is formed to provide two looped coils 10a' and 10a", each of which is in thermal exchange relation with one of the plates 45a and 46a. As best shown in Fig. 5, each looped coil 10a' and 10a" includes spaced apart straight portions which are more or less parallel to one another and connecting bends, thereby forming a number of U-shaped pipe portions which are serially connected to one another. Further, the legs of certain U-shaped elements or pipe portions are disposed between the legs of other U-shaped elements to provide a compact arrangement of the looped coils 10a' and 10a".

As best shown in Fig. 6, the looped coil 10a' is arranged in thermal relation with the upper side of the plate 45a, and the looped coil 10a" is arranged in thermal relation with the underside of the plate 46a. It will be seen that the diameter of the piping forming the looped coil 10a' is smaller than that of the piping forming the looped coil 10a", and that the horizontal planes tangential to the top and bottom portions of the looped coil 10a' are at levels between the horizontal planes tangential to the top and bottom portions of the looped coil 10a".

The looped coils 10a' and 10a" may be arranged in good heat conducting relation with the plates 45a and 46a in any suitable manner, as by clamping members 48a which envelop the straight portions of the coils and are secured to the spaced apart plates forming the top wall 51 of the shell 50.

Essentially, the spaced apart plates 45a and 46a form a container or vessel which desirably is filled with a suitable insulating material 64 for thermally shielding the two portions 10a' and 10a" of the evaporator section 10a from one another. In order to obtain the compact arrangement of the looped coils 10a' and 10a" in the manner just described, it will be seen that the bottom plate 45a is formed with a depressed region 65 immediately beneath looped coil 10a" along the length thereof, as seen in Fig. 6, so that each looped coil is out of physical contact and removed from the plate to which it is not thermally connected. In the embodiment being described it will be seen that a cold accumulator 45a is provided for the frozen food section 44a.

In the operation of the embodiment being described, liquid refrigerant and inert gas weak in refrigerant first flow through the looped coil 10a' which is in thermal contact with the bottom plate 45a of the top wall 51 of the cooling unit. With such arrangement strong cooling of the plate 45a is effected which serves as the ceiling or roof of the frozen food section 44a, the bottom wall 40a of which is constructed to insulate such frozen food section from the lower food compartment 41a.

From the looped coil 10a' liquid refrigerant and inert gas then flow in the presence of each other into the looped coil 10a" which is in thermal contact with the upper plate 46a of the top wall of the freezing unit. In this manner strong cooling of the plate 46a is also effected which serves as a supporting shelf of the ice freezing section 43a of the freezing unit. When the load on the ice freezing section 43a is increased by placing ice trays containing water to be frozen on the plate 46a, the temperature of the looped coil or evaporator portion 10a" increases. However, such rise in temperature of the evaporator portion 10a" does not adversely affect or cause any rise in temperature of the looped coil or evaporator portion 10a', because liquid refrigerant and inert gas weak in refrigerant are continuously introduced into the latter. Hence, the plate 45a will always be strongly cooled by the looped coil 10a' to keep frozen food in the frozen food section 44a at a safe refrigerating temperature, irrespective of sudden increase in load on the ice freezing section 43a.

Since the frozen food section 44a will be primarily employed for storing frozen food packages, the load on the looped coil or evaporator portion 10a' will be relatively small. Consequently, liquid refrigerant will practically always be supplied to the looped coil or evaporator portion 10a", and the inert gas which is introduced therein will not be too rich in refrigerant vapor, so that the evaporator portion 10a" will be quite effective to effect cooling of the ice freezing section 43a for the purpose of producing ice.

In the embodiment of Figs. 4 to 7 a cold accumulator 45b is provided for the frozen food section 44b. It will be understood that the provision of the cold accumulator 45b in Figs. 4 to 7 will act to restrict changes or variations in temperature of the frozen food section 44a, and this is particularly true when the operation of the refrigeration system is thermostatically controlled responsive to a temperature condition of the air being cooled or temperature of an evaporator section. In such case the supply of heat to the generator unit is reduced from time to time to regulate the refrigerating effect produced by the evaporator sections. During the periods when the heat input to the generator unit is reduced, the cold accumulator 45b exerts a stabilizing influence and acts to maintain the frozen food section 44a at a safe refrigerating temperature at all times.

Since the plate 46a and evaporator portion 10a" of the ice freezing section 43a are thermally shielded from the evaporator portion 10a' of frozen food section 44a, the cold accumulator 45b does not influence ice freezing in the ice freezing section 43a to any significant extent.

Figure 8:
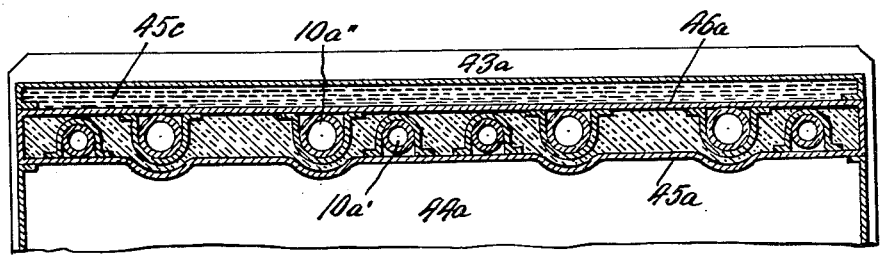
Figure 9:
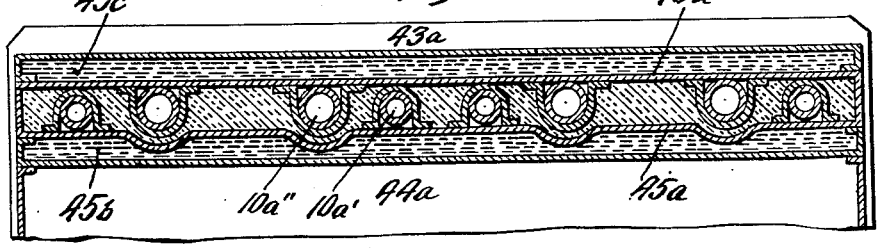

If it is desired to utilize the cold accumulator 45b to accelerate freezing of ice in the ice freezing section 43a, heat conductive members may be provided which provide a thermal connection between the top plate of the cold accumulator and plate 46a. Such an arrangement is preferable to that of providing direct thermal contact between the plate 46a and top wall of the cold accumulator, or between the looped coils 10a' and 10a". In certain instances it may be advantageous to provide the cold accumulator on the plate 46a, so that ice trays containing water to be frozen can be placed thereon, or a second cold accumulator may be provided on top of the plate 46a in addition to that shown in Figs. 4 to 7 which is in thermal relation with the looped coil 10a'. An arrangement in which a cold accumulator 45c is disposed at the top of the plate 46a is illustrated in Fig. 8; and an arrangement in which both the cold accumulators 45b and 45c are employed is illustrated in Fig. 9.

In certain instances advantages are realized by providing a construction in which the ice freezing section is located below the frozen food section of the freezing unit. Such an arrangement is shown in Fig. 10 in which the looped coil 10c' is positioned at the roof or ceiling of the frozen food section 44c. The looped coil 10c' is fixed to a plate 66 which is insulated from the inner lining 67 of the cabinet interior 12c in any suitable manner. The bottom of the frozen food section 44c is formed by a partition 40c constructed to be heat insulating, such partition also serving as the roof or ceiling of the ice freezing section 43c. The looped evaporator coil 10c" is in thermal relation with the underside of plate 46c which serves as the supporting shelf of the ice freezing section 43c. The plate 46c and plate 68 closely adjacent thereto form a container or vessel in which the looped coil 10c" and another looped coil 11c are disposed, the latter being in thermal contact with the upper side of the plate 68. The looped coils 10c" and 11c are thermally shielded from one another by suitable insulation 64c, and a plurality of members 69 are fixed to the underside of plate 68 to provide a relatively extensive heat transfer surface to promote efficient cooling of air in the space 41c by the looped evaporator coil 11c.

In the embodiment of Fig. 10, the looped evaporator coils are connected in series whereby inert gas first flows through the uppermost looped coil 10c', then through the looped coil 10c" and finally through the looped coil 11c which constitutes the higher temperature evaporator section corresponding to evaporator section 11 in Fig. 1 and evaporator section 11a in Figs. 4 and 7. Hence, inert gas weak in refrigerant initially flows through looped coil 10c' which corresponds to looped coil 10a' in Fig. 6, and the cooling effect produced by this looped coil is utilized to maintain the frozen food section 44c at a safe refrigerating temperature irrespective of changes in load on looped coil 10c" which is utilized to produce ice in the ice freezing section 43c. The operating temperature of the higher temperature looped coil 11c may be about 0° C. or slightly below this value. In Fig. 10 a cold accumulator 45d is provided for the looped coil 10c". A modification of the embodiment of Fig. 10 is illustrated in Fig. 11 in which a cold accumulator 45e is provided for the looped coil 10c'. In the modification shown in Fig. 12 both cold accumulators 45d and 45e are provided for the looped coils 10c" and 10c', respectively.

The cold accumulators may employ any well known eutectic solution having a sufficiently low freezing temperature, so that heat can be abstracted at a low temperature which is below 0° C., for example. Various substances can be employed to provide the eutectic solution desired depending upon the operating temperatures of the different sections of the cooling unit. It will be understood that homogeneous substances having a melting point below the freezing temperature of water can be employed as well as eutectic solutions.

Modifications of the embodiments of our invention which we have described will occur to those skilled in the art, so that we desire our invention not to be limited to the particular arrangements set forth and intend in the claims to cover all modifications which do not depart from the spirit and scope of the invention. However, the provision of a looped coil which is disposed essentially in a single horizontal plane and heat conductively connected to horizontally disposed members, in a manner generally like that shown, for example, in the embodiment of Figs. 4, 5 and 6, is being claimed in copending application Serial No. 324,530, filed December 6, 1952.

What is claimed is:

1. In a refrigerator comprising a cabinet having a thermally insulated interior divided into a freezing compartment and a higher temperature food storage compartment, an absorption refrigeration system of the inert gas type having a circuit for circulation of inert gas therethrough comprising evaporator structure including a low temperature evaporator arranged to produce a refrigerating effect in said freezing compartment and a higher temperature evaporator arranged to produce a refrigerating effect in said food storage compartment, means for supplying liquid refrigerant to said evaporators for evaporation therein in the presence of the circulating inert gas to produce said refrigerating effects, and means for distributing the refrigerating effect capable of being produced by said evaporator structure during operation of the system, said distributing means including a cold accumulator heat conductively connected to said low temperature evaporator, said cold accumulator containing a fluid whose temperature becomes reduced during periods of low load to produce a source of supply of refrigeration which is available upon increase in load on said low temperature evaporator during operation of the system to reduce the quantity of liquid refrigerant necessary in the latter to satisfy such increased refrigerating load and increase the quantity of refrigerant immediately available in said higher temperature evaporator.

2. Apparatus as set forth in claim 1 in which said means for supplying liquid refrigerant includes connections for conducting refrigerant to said low temperature evaporator for flow therethrough and said higher temperature evaporator is connected to receive refrigerant from said low temperature evaporator, said cold accumulator serving to reduce the quantity of liquid refrigerant necessary in the low temperature evaporator upon increase in load on the latter during operation of the system and making such refrigerant immediately available in the higher temperature evaporator.

3. Apparatus as set forth in claim 1 in which the fluid in said cold accumulator comprises a body of congealable fluid like an eutectic solution, for example, such cold accumulator heat conductively connected to said low temperature evaporator being disposed in the interior of the cabinet and providing a supporting surface for matter to be refrigerated in said freezing compartment.

4. Apparatus as set forth in claim 1 in which said low temperature evaporator comprises a horizontally extending element disposed in the interior of said cabinet and said cold accumulator comprises a flat horizontlly extending container in thermal contact with said low temperature evaporator, the fluid in said container comprising a body of congealable liquid like an eutectic solution, for example, and partition means to provide said freezing compartment and food storage compartment which includes said container.

5. Apparatus as set forth in claim 1 in which said low temperature evaporator is employed for ice producing purposes, said low temperature evaporator comprising a horizontally extending member disposed in said cabinet and said cold accumulator and fluid therein comprising a vessel and a body of congealable liquid held therein like an eutectic solution, for example, said cold accumulator being in thermal contact with said member and providing a supporting surface for shallow trays in which ice is adapted to be produced.

References Cited in the file of this patent
UNITED STATES PATENTS

| | | |
|---|---|---|
| 2,073,123 | Smith | Mar. 9, 1937 |
| 2,257,924 | Vretman | Oct. 7, 1941 |
| 2,345,453 | Brace | Mar. 28, 1944 |
| 2,428,312 | Herbener | Sept. 30, 1947 |
| 2,589,550 | Iwashita | Mar. 18, 1952 |